(12) United States Patent
Guldenfels et al.

(10) Patent No.: US 6,425,479 B1
(45) Date of Patent: Jul. 30, 2002

(54) CONVEYING APPARATUS HAVING A MODULAR CONVEYING BELT AND AT LEAST ONE TOOTHED DRIVE WHEEL

(75) Inventors: Dieter Guldenfels, Pfeffingen; Felix Rolle, Muttenz, both of (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 09/551,068

(22) Filed: Apr. 18, 2000

(51) Int. Cl.$^7$ .............................................. B65G 17/06
(52) U.S. Cl. ....................................................... 198/834
(58) Field of Search .................................. 198/834, 853

(56) References Cited

U.S. PATENT DOCUMENTS

| | | | |
|---|---|---|---|
| 3,602,364 A | * 8/1971 | Maglio et al. | 198/853 X |
| 4,556,142 A | 12/1985 | Lapeyre | 198/822 |
| 4,821,872 A | 4/1989 | Lapeyre | 198/853 |
| 4,925,016 A | 5/1990 | Lapeyre | 198/834 |
| 4,989,723 A | 2/1991 | Bode et al. | 198/635 |
| 4,993,543 A | * 2/1991 | Lapeyre | 198/834 |
| 5,074,406 A | * 12/1991 | Gundlach et al. | 198/834 |
| 5,123,524 A | * 6/1992 | Lapeyre | 198/853 |
| 5,263,575 A | * 11/1993 | Leder | 198/834 |
| 5,413,211 A | 5/1995 | Faulkner | 198/690.2 |
| 5,706,934 A | * 1/1998 | Palmaer et al. | 198/853 |
| 5,797,820 A | * 8/1998 | Endo | 198/853 X |
| 5,826,705 A | 10/1998 | Ramsey et al. | 198/853 |

FOREIGN PATENT DOCUMENTS

| | | | |
|---|---|---|---|
| EP | 0113909 | 12/1983 | B65G 17/08 |
| GB | 1199151 | 6/1966 | B65G 17/06 |

* cited by examiner

Primary Examiner—Stephen T. Gordon
Assistant Examiner—Patricia Engle
(74) Attorney, Agent, or Firm—Hodgson Russ LLP

(57) ABSTRACT

A conveying apparatus comprises a modular conveying belt (1), which is made up of a plurality of modules (2), and a plurality of toothed drive wheels (4). The modules (2) have a module body (21), two series of articulation-eyelet elements (22, 23), which project from opposite sides of the module body (21) and each comprise an articulation eyelet (221, 231), and a transverse rib (24) arranged on the underside of the module body (21), transversely to the conveying direction. Two adjacent modules (2) interengage and are articulated on one another by an articulation rod (3). The toothed drive wheels (4) have teeth (41, 42) which, during driving of the conveying belt (1), are positioned against the transverse ribs (24). The modules (2) and the toothed drive wheels (4) are designed and arranged such that, during driving of the conveying belt (1), the teeth (41, 42) each engage between two adjacent articulation-eyelet elements (22, 23) of a module (2), in order to form direct lateral guides for these two articulation-eyelet elements (22, 23).

19 Claims, 3 Drawing Sheets

CONVEYING APPARATUS HAVING A MODULAR CONVEYING BELT AND AT LEAST ONE TOOTHED DRIVE WHEEL

CROSS-REFERENCE TO RELATED APPLICATION

Applicants hereby claim priority based on Swiss Patent Application No. 837/99 filed May 5, 1999.

FIELD OF THE INVENTION

The present invention relates to a conveying apparatus having a modular conveying belt and at least one toothed drive wheel.

BACKGROUND OF THE INVENTION

Known modular conveying belts are made up of a plurality of modules in which each has a plate-like module body and a first and second series of articulation-eyelet elements which project from two opposite sides of the module body. Each of these articulation-eyelet elements comprises an articulation eyelet, it being the case that the articulation eyelets of each of the two articulation-eyelet-element series are aligned in order to receive a continuous articulation rod. Two adjacent modules interengage and are articulated on one another by an articulation rod which passes through the articulation eyelets of one articulation-eyelet-element series of one module and the articulation eyelets of one articulation-eyelet-element series of the other module. The modules are usually offset with respect to one another, with the result that it is possible to form a conveying belt of the desired length and width. The conveyable articles are transported on conveying surfaces of the module bodies and of the articulation-eyelet elements.

In certain applications, particularly in the foodstuffs industry, it is necessary to have a conveying-belt structure which can easily be cleaned. A modular conveying belt of this type is described, for example, in U.S. Pat. No. 4,925,016. In order to drive the conveying belt, a transverse rib is arranged on the underside of the module bodies, transversely to the conveying direction in each case. Longitudinal ribs have been dispensed with in order to ensure good cleaning. The conveying belt is driven by a plurality of parallel, spaced-apart toothed drive wheels which have drive teeth which are positioned against the transverse ribs. Provided on the toothed drive wheels in addition to said drive teeth are guide teeth which each engage in the gap between two adjacent articulation-eyelet elements of interengaging modules and thus guide the modular conveying belt laterally.

This conveying apparatus known from U.S. Pat. No. 4,925,016 has the disadvantage that the toothed drive wheels have guide teeth in addition to the drive teeth, that is to say they involve relatively high outlay in structural terms. Moreover, the additional guide teeth make cleaning more difficult and there is a risk of conveyable articles passing onto the conveying-belt underside being pressed by said guide teeth into the narrow interspace between two adjacent articulation-eyelet elements, from where they were very difficult to remove again.

SUMMARY OF THE INVENTION

In view of the disadvantages of the hitherto-known, above-described, modular conveying belts and toothed drive wheels, the object of the invention is to provide a conveying apparatus of the type mentioned in the introduction in the case of which the toothed drive wheel or the toothed drive wheels, which serves/serve both for driving and for guiding the modular conveying belt, is/are of as straightforward a construction as possible. The conveying belt and the toothed drive wheel or wheels are also intended to be easy to clean.

The object is achieved by the conveying apparatus according to the invention as is defined in independent Patent Claim 1. Preferred design variants can be gathered from the dependent patent claims. Independent Patent Claims 9 and 10 related respectively to a toothed drive wheel and to a modular conveying belt according to the invention.

The invention relates to a conveying apparatus having a modular conveying belt which is made up of a plurality of modules, and having at least one toothed drive wheel. The modules each have a plate-like module body and a first and second series of articulation-eyelet elements which project from two opposite sides of the module body and each comprise an articulation eyelet. Two adjacent modules interengage and are articulated on one another by an articulation rod which passes through the articulation eyelets of one articulation-eyelet-element series of one module and the articulation eyelets of one articulation-eyelet-element series of the other module. The at least one toothed drive wheel has teeth for driving the conveying belt. The essence of the invention, then, resides in the fact that the modules and the at least one toothed drive wheel are designed and arranged such that, during driving of the conveying belt, the teeth each engage between two adjacent articulation-eyelet elements of a module, in order to form direct lateral guides for these two articulation-eyelet elements.

By virtue of the invention, the toothed drive wheels can be produced in a more straightforward manner than in the case of the hitherto-known conveying apparatuses having modular conveying belts which have modules with plate-like module bodies. Instead of separate drive and guide teeth, both the drive function and the guidance function are performed by the same teeth. Since these teeth do not engage in the gap between two adjacent articulation-eyelet elements of interengaging modules, the risk of conveyable articles passing onto the conveying-belt underside being pressed into the gap is reduced to a considerable extent.

Moreover, it is possible to use the same toothed drive wheels both for modular conveying belts with continuous conveying surfaces and with conveying surfaces which are provided with openings, e.g., grid-like conveying surfaces, as well as for conveying belts which do not have any gaps between two adjacent eyelets. A single toothed-drive-wheel shape is sufficient for all belt types with the same pitch. A cost-effective solution with straightforward storage is thus provided.

Since, alongside the articulation-eyelet elements and the transverse ribs which are provided in a fair number of design variants, there are no additional elements for belt guidance, e.g., ribs or protuberances, on the underside of the modular conveying belt, the latter is also easy to clean.

BRIEF DESCRIPTION OF THE DRAWINGS

The conveying apparatus according to the invention is described in more detail hereinbelow by way of two exemplary embodiments and with reference to the attached drawings, in which.

DESCRIPTION OF THE PREFERRED EMBODIMENTS

Figure 1:
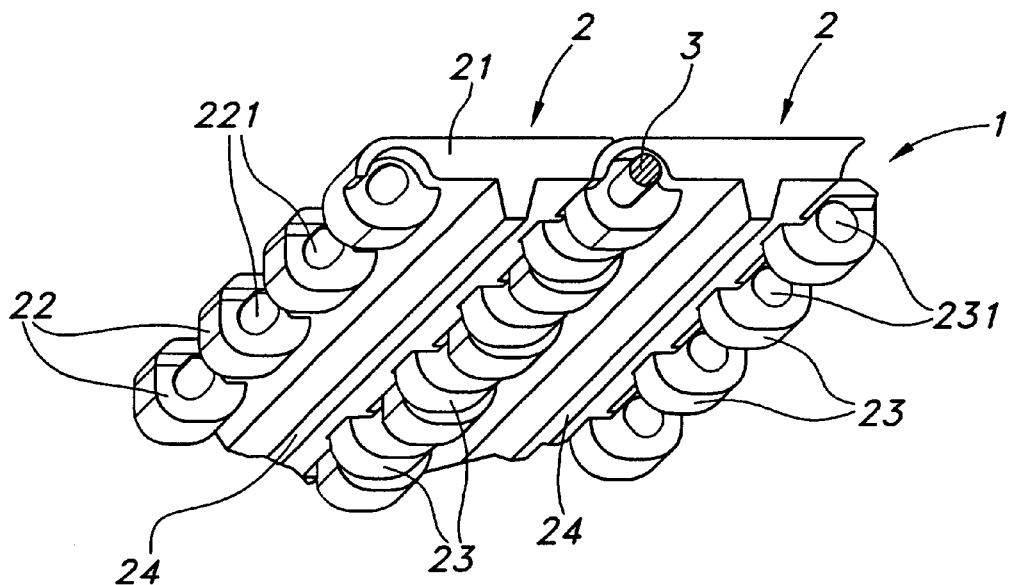
FIG. 1 shows a perspective view, obliquely from beneath, of two modules, connected by an articulation rod, of a first exemplary embodiment of a modular conveying belt according to the invention.

Referring to FIG. 1, that part of a modular conveying belt 1 which is illustrated is made up of two interengaging modules 2 which are articulated on one another by means of an articulation rod 3. Each module 2 has a module body 21, a first and second series of articulation-eyelet elements 22, 23,, which project from two opposite sides of the module body 21 and each comprise an articulation eyelet 221, 231 in the form of a slot, and a transverse rib 24 arranged on the underside of the module body 21, transversely to the conveying direction. A part of the articulation-eyelet elements 22, 23 extends in each case directly on the underside of the module body 21. The articulation eyelets 221, 231 of each of the two articulation-eyelet-element series 22, 23 are aligned with one another and arranged more or less at an angle of 45° to the conveying surface, with the result that the articulation rod 3 can pass through the articulation eyelets 231 of one articulation-eyelet-element series 23 of one module 2 and the articulation eyelets 221 of one articulation-eyelet-element series 22 of the other module 2 and is fixed by the two articulation-eyelet-element series 22, 23.

The articulation-eyelet elements 22, 23 are considerably wider in their top part than in their bottom part, which has the articulation eyelet 221, 231 with the result that adjacent articulation-eyelet elements 22, 23 of interengaging modules 2 adjoin one another in a virtually gap-free manner in the top region. Moreover, the top side of the modules 2 is of flat design, which results in a planar, essentially virtually fully continuous conveying surface.

The transverse ribs 24 extend downwards from the underside of the module bodies 21, in the center of the latter, and have a symmetrical, in this case trapezoidal cross section, with the result that the modular conveying belt 1 can be moved just as easily forwards as backwards, perpendicularly to the transverse ribs 24.

The following applies to the rest of this description. If, in order to clarify the drawings, a figure contains designations which are not explained in the directly associated text of the description, then you are referred to the point at which they have been mentioned in previous descriptions of the figures.

Figure 2:
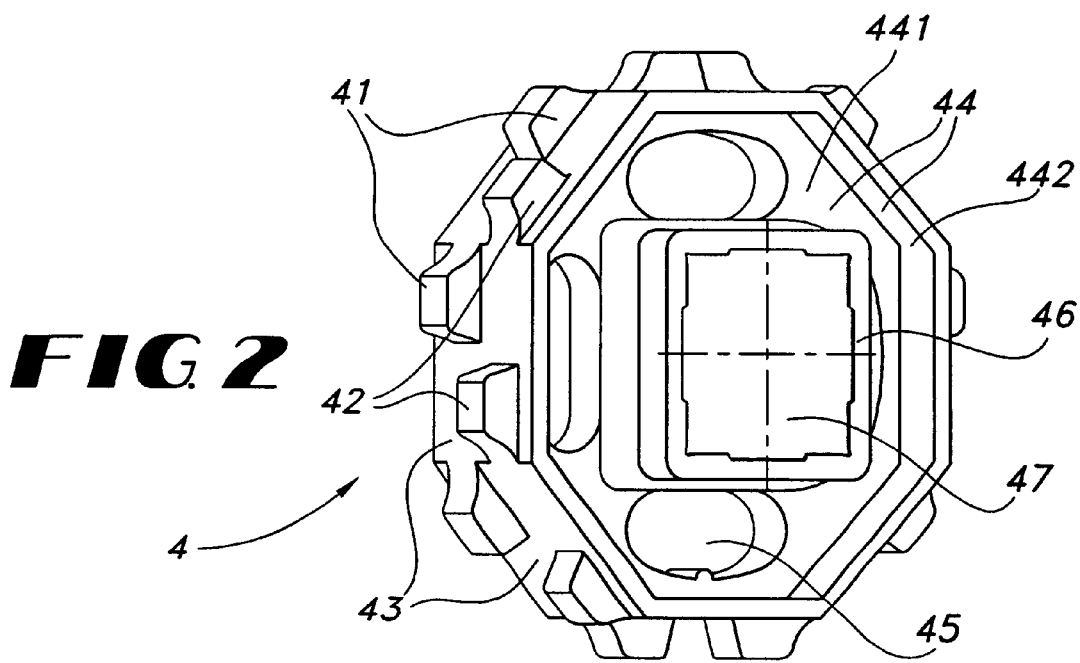
FIG. 2 shows a perspective view of a toothed drive wheel according to the invention.

Referring to FIG. 2, the toothed drive wheel 4 illustrated comprises an octagonal wheel body 44 which is provided with four oval holes 45 and in the center of which there is arranged a hub 46 with an essentially square opening 47 which is fastened on a square shaft. The wheel body 44 is of considerably wider design in the outer region 442 than in the inner region 441 and, on its outer circumference, forms eight planar surfaces 43 on which two teeth 41, 42 are arranged in each case. The two teeth 41, 42 arranged on the surface 43 are each of the same shape, but have been rotated through 180° with respect to one another. Those ends of the two teeth 41, 42 which are directed away from one another in the direction of rotation of the toothed drive wheel 4 each extend as far as the border of the planar surface 43.

The teeth 41, 42 are distributed in two series over the circumference of the toothed drive wheel 4 such that, during driving of the modular conveying belt 1, the transverse ribs 24 of the latter each end up between one tooth 41 of one series and one tooth 42 of the other series, and driving in both directions of rotation of the toothed drive wheel 4 is possible. The teeth 41 of one series and the teeth 42 of the other series are offset laterally with respect to one another.

Figure 3:
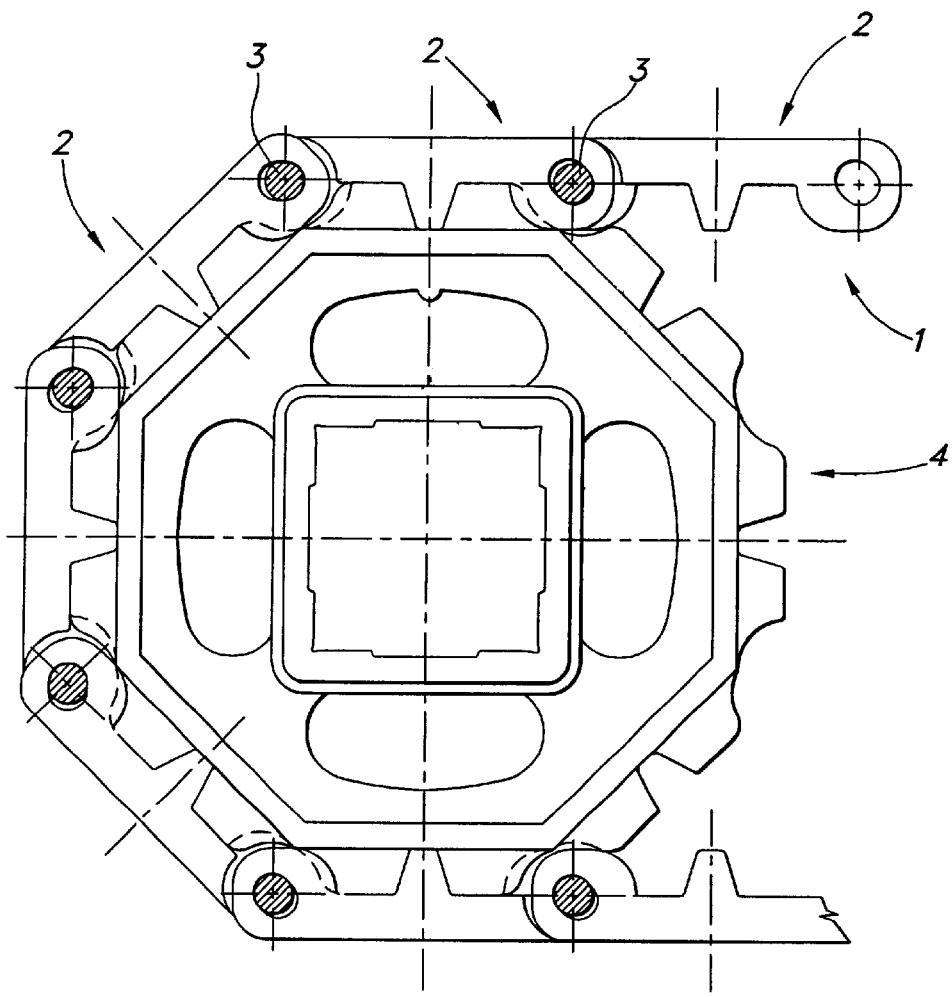
FIG. 3 shows the modular conveying belt from FIG. 1 being driven and guided by the toothed drive wheel from FIG. 2.
Figure 4:
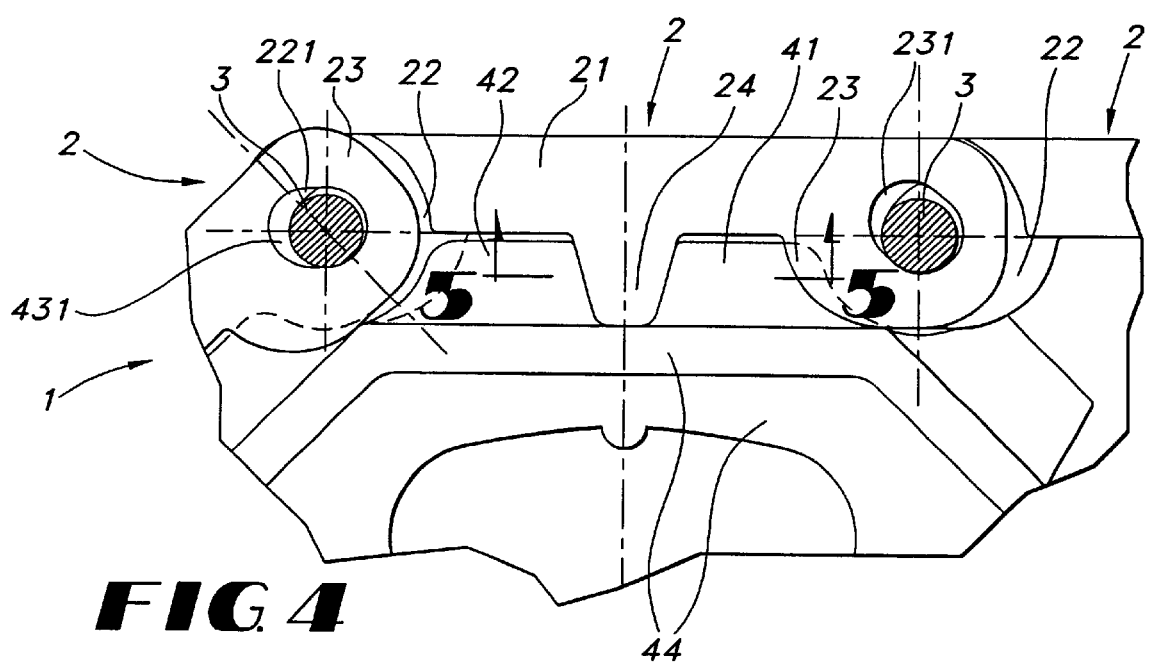
FIG. 4 shows an enlarged detail from FIG. 3.
Figure 5:
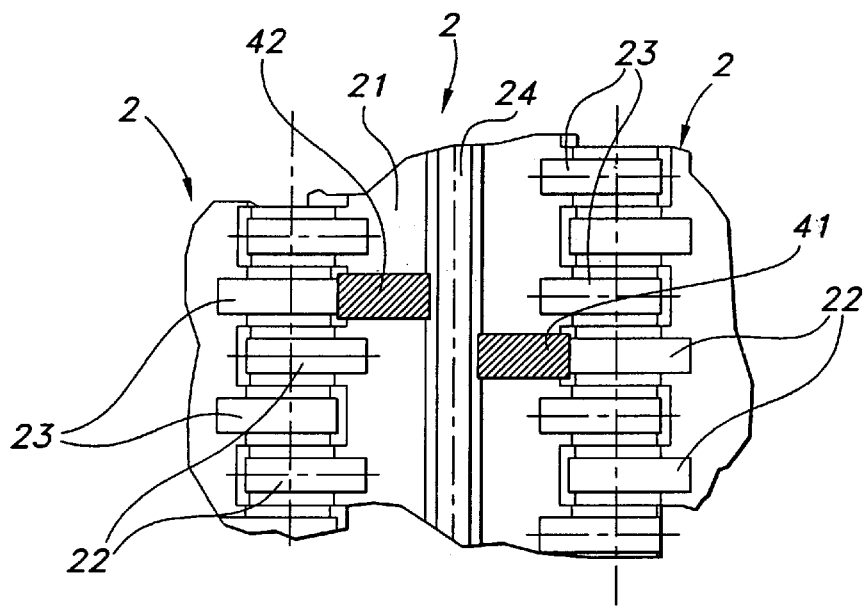
FIG. 5 shows a view from beneath a part of the modular conveying belt from FIG. 4 with toothed-driven-wheel teeth sectioned along line A—A.

Turning to FIGS. 3–5, in order to drive the modular conveying belt 1, which comprises a multiplicity of modules 2 articulated on one another by means of articulation rods 3, use is usually made of a plurality of toothed drive wheels 4 spaced apart from one another on a shaft, only one toothed drive wheel being visible here. It can clearly be seen that the transverse ribs 24 of the driven modules 2 are each located between one tooth 41 of one series and one tooth 42 of the other series, and, depending on the direction of rotation, the tooth 41 or the tooth 42 pushes the corresponding transverse rib 24 forwards.

Those ends of the teeth 41, 42 which are directed away front the transverse ribs 24 each extend between two adjacent articulation-eyelet elements 22, 23 of a module 2, with the result that, during driving of the conveying belt 1, the teeth 41, 42 each engage between two adjacent articulation-eyelet elements 22, 23 of one module 2 and, at the same time, between the transverse rib 24 of said module 2 and the articulation-eyelet element 23, 22, likewise engaging between said two adjacent articulation-eyelet elements 22, 23, of the articulated module 2. The side surfaces of the teeth 41,42 serve as guide surfaces for the side surfaces of the articulation-eyelet elements 22, 23 since the modules 2 can only be displaced laterally to the extent where the side surfaces of the articulation-eyelet elements 22, 23 butt against the side surfaces of the teeth 41, 42.

Figure 6:
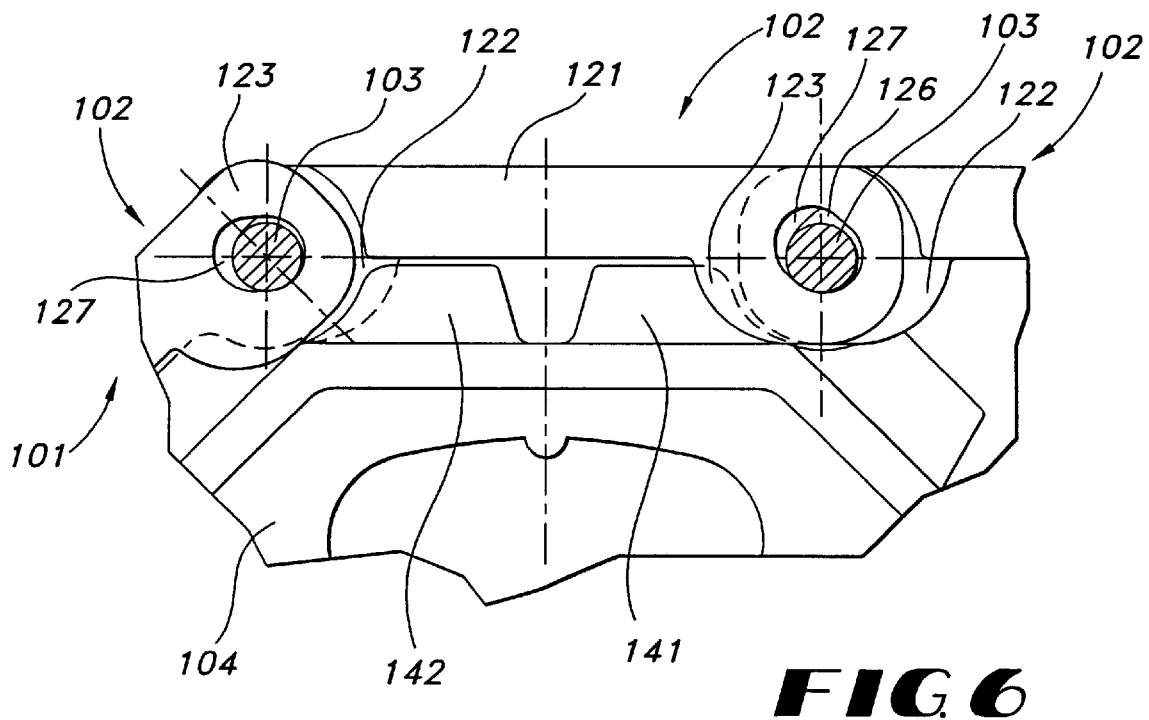
FIG. 6 shows a second exemplary embodiment of a modular conveying belt being driven and guided by a toothed drive wheel.

In FIG. 6, the modular conveying belt 101 according to the second exemplary embodiment illustrated is made up of interengaging modules 102 which are articulated on one another by means of articulation rods 103. Each module 102 has a module body 121 and a first and second series of articulation-eyelet elements 122, 123 which project from two opposite sides of the module body 121 and each comprise an articulation eyelet 126, 127 in the form of a slot. A part of the articulation-eyelet elements 122, 123 extends in each case directly on the underside of the module body 121. The articulation eyelets, 126, 127 of each of the two articulation-eyelet-element series 122, 123 are aligned with one another and arranged more or less at an angle of 45° to the conveying surface, with the result that the articulation rod 103 can pass through the articulation eyelets 126 of one articulation-eyelet-element series 122, 123. In contrast to the modular conveying belt 1, the modular conveying belt 101 does not have any transverse rib on the underside of the module body 121. The ease of cleaning is thus further improved.

Apart from the shape of the teeth 141, 142, the toothed drive wheel 104 is of the same construction as the toothed drive wheel 4. Since the conveying belt 101 is driven in this case by the teeth 141, 142 being positioned against the articulation-eyelet elements 122, 123, the amount of play between the teeth 141, 142 and the articulation-eyelet elements 122, 123 must not be as high as in the case of the first exemplary embodiment. The teeth 141, 142 are thus of longer design at the ends which are directed away from one another, with the result that, during driving, they each butt against the articulation-eyelet element 122, 123 located in front of them in the conveying direction. In the case of the example illustrated, the teeth 142 push the articulation-eyelet elements 123, and thus the conveying belt 101, to the left.

Further design variations can be realized in relation to the above-described conveying apparatus. The following should be expressly mentioned here:

It is also conceivable to use a toothed drive wheel 4; 104 with a round outer circumference.

The teeth 41, 42 and the transverse ribs 24 may be of specific shapes which allow better mutual rolling characteristics. The same applies to the teeth 141, 142 and the articulation-eyelet elements 122, 123.

Instead of, in the second exemplary embodiment, the teeth 141, 142 of the toothed drive wheel 104 being of longer configuration than in the first exemplary embodiment, it would also be possible for the articulation-eyelet elements 122, 123 of the modular conveying belt 101 to be of longer design.

What is claimed is:

1. A conveying apparatus having a modular conveying belt (1, 101) which is made up of a plurality of modules (2, 102) and a first and second series of articulation-eyelet elements (22, 23, 122, 123) which project from two opposite sides of a module body (21, 121) and each comprise an articulation eyelet (221, 231, 126, 127), in which two adjacent modules (2, 102) interengage and are articulated on one another by an articulation rod (3, 103) which passes through the articulation eyelets (221, 231, 126, 127) of one articulation-eyelet-element series of the adjacent modules (2, 102), and having at least one toothed drive wheel (4, 104) with teeth (41, 42, 141, 142) for driving the conveying belt (1, 101), characterized in that the modules (2, 102) and the at least one toothed drive wheel (4, 104) are designed and arranged such that, during driving of the conveying belt (1, 101), the teeth (41, 42, 141, 142) each engage against an articulation-eyelet-element of a first module and are positioned between two adjacent articulation-eyelet elements (22, 23, 122, 123) of a second module (2, 102) forming direct lateral guides for the modular conveying belt.

2. Conveying apparatus according to claim 1, characterized in that on each module one transverse rib (24) is arranged on the underside of the module bodies (21), transversely to the conveying direction, and, during driving of the conveying belt (1), the teeth (41, 42) of the toothed drive wheel (4) engage against said transverse ribs (24).

3. Conveying apparatus according to claim 2, characterized in that the articulation-eyelet elements (22, 23, 122, 123) each have a part extending directly on the underside of the module body (21, 121).

4. Conveying apparatus according to claim 3, characterized in that the underside of the module bodies (21, 121) is smooth apart from the transverse rib (24) and the parts of the articulation-eyelet elements (22, 23, 122, 123) which extend directly on the underside of the module body (21, 121).

5. Conveying apparatus according to claim 2, characterized in that the at least one toothed drive wheel (4, 104) has two series of teeth (41, 42, 141, 142) distributed over the circumference, the teeth (41, 141) of one series and the teeth (42, 142) of the other series being offset with respect to one another laterally and in the circumferential direction, with the result that, during driving of the conveying belt (1, 101), the transverse ribs (24) each end up between one tooth (41, 141) of one series and one tooth (42, 142) of the other series.

6. Conveying apparatus according to claim 5, characterized in that one tooth (41, 141) of one series and one tooth (42, 142) of the other series are arranged on a planar surface (43) of its drive wheel, in which the ends of the two teeth (41, 42, 141, 142) which are directed away from one another in the conveying direction extend as far as a border of the surface (43), and the two teeth (41, 42, 141, 142) arranged on a surface (43) are preferably of the same shape but have been rotated through 180° in a horizontal plane with respect to one another.

7. The conveyor apparatus of claim 5 wherein each tooth of one series of teeth has a curved surface which engages against a matching curved surface of the articulation-eyelet element of the first module and wherein each tooth of the other series of teeth further has a planar drive surface which engages against matching planar drive surface of the transverse rib of the second module.

8. The conveyor apparatus of claim 5 wherein each tooth in the two series of teeth have a curved surface which engages against a matching curved surface of the articulation-eyelet element of the first module and a third module and further having a planar drive surface which engages against a matching planar drive surface of the transverse rib of the second module with the teeth of one series having the curved tooth surface facing in a forward direction and the planar drive surface facing in a rearward direction and wherein the teeth of the other series have the curved tooth surface facing in a rearward direction and the planar drive surface facing in a forward direction so that the modular conveyor belt is capable of being driven in both a forward and a rearward direction.

9. The conveyor apparatus of claim 2 wherein the transverse rib has a trapezoidal cross-section.

10. The conveyor apparatus of claim 2 wherein at least a portion of the transverse rib engaged by the teeth is planar.

11. The conveyor apparatus of claim 2 wherein at least a portion of the teeth which engages against the transverse rib is planar.

12. The conveyor apparatus of claim 2 wherein at least a portion of the transverse rib engaged by the teeth is planar to match a similarly planar drive surface of the teeth.

13. The conveyor apparatus of claim 12 wherein the matching planar surface of the transverse rib and the planar drive surface of the teeth are inclined with respect to an upper surface of the module.

14. Conveying apparatus according to claim 1, characterized in that, during driving of the conveying belt (101), the teeth (141, 142) of the toothed drive wheel (104) are positioned against the articulation-eyelet elements (122, 123).

15. A conveying apparatus according to claim 1, characterized in that the toothed drive wheel has at least two laterally and circumferentially offset series of teeth (41, 42, 141, 142) distributed over the circumference.

16. The conveying apparatus of claim 1 wherein at least a portion of the articulation-eyelet elements engaged by the teeth is curved.

17. The conveyor apparatus of claim 1 wherein at least that a portion of the teeth which engages against articulation-eyelet elements is curved.

18. The conveyor apparatus of claim 1 wherein at least a portion of the articulation-eyelet elements engaged by the teeth is curved to match a similarly curved drive surface of the teeth.

19. Conveying apparatus having a modular conveying belt (1, 101) which is made up of a plurality of modules (2, 102) and a first and second series of articulation-eyelet elements (22, 23, 122, 123) which project from two opposite sides of a module body (21, 121) and each comprise an articulation eyelet (221, 231, 126, 127), in which two adjacent modules (2, 102) interengage and are articulated on one another by an articulation rod (3, 103) which passes through the articulation eyelets (221, 231, 126, 127) of one articulation-eyelet-element series of the adjacent modules (2, 102), wherein each module has a transverse rib provided on the underside of the module body, transversely to the conveying direction, and having a toothed drive wheel (4, 104) with teeth (41, 42, 141, 142) for driving the conveying belt (1, 101), the drive wheel having two series of teeth (41, 42, 141, 142) distributed over the circumference, the teeth (41, 141) of one series and the teeth (42, 142) of the other series being offset with respect to one another laterally and in the circumferential direction, and wherein each tooth in two series of teeth have a curved surface which engages against a matching curved surface of the articulation-eyelet element of the first module and a third module and further having a planar drive surface which engages against a matching planar drive surface of the transverse rib of a second module with the teeth of one series having the curved tooth surface facing in a forward direction and the planar drive surface facing in a rearward direction and wherein the teeth of the other series have the curved tooth surface facing in a rearward direction and the planar drive surface facing in a forward direction so that the modular conveyor belt is capable of being driven in both a forward and a rearward direction.

* * * * *